US012235400B2

(12) United States Patent
Englund

(10) Patent No.: US 12,235,400 B2
(45) Date of Patent: Feb. 25, 2025

(54) METHOD AND SYSTEM FOR DISTRIBUTED FIBRE OPTIC SENSING

(71) Applicant: FIBER SENSE PTY LTD, Mosman (AU)

(72) Inventor: Mark Andrew Englund, Mosman (AU)

(73) Assignee: Fiber Sense Limited, Mosman (AU)

( * ) Notice: Subject to any disclaimer, the term of this patent is extended or adjusted under 35 U.S.C. 154(b) by 823 days.

(21) Appl. No.: 17/293,422

(22) PCT Filed: Nov. 13, 2019

(86) PCT No.: PCT/AU2019/051249
§ 371 (c)(1),
(2) Date: May 12, 2021

(87) PCT Pub. No.: WO2020/097682
PCT Pub. Date: May 22, 2020

(65) Prior Publication Data
US 2022/0018980 A1  Jan. 20, 2022

(30) Foreign Application Priority Data
Nov. 13, 2018 (AU) .................................. 2018904319

(51) Int. Cl.
*G01V 1/22* (2006.01)
*G01D 5/353* (2006.01)
(52) U.S. Cl.
CPC ......... *G01V 1/226* (2013.01); *G01D 5/35358* (2013.01); *G01D 5/35383* (2013.01)
(58) Field of Classification Search
CPC .................... G01V 1/226; G01D 5/35358
See application file for complete search history.

(56) References Cited

U.S. PATENT DOCUMENTS 7,136,156 B1  11/2006  Quint
9,569,960 B2   2/2017  Xu et al.
(Continued)

FOREIGN PATENT DOCUMENTS

CN  101051869 A  10/2007
CN  102243795 A  11/2011
(Continued)

OTHER PUBLICATIONS

A. F. K. Calderon, E. J. V. Porras, and O. J. S. Parra, "Predicting traffic through artificial neural networks," Contemporary Engineering Sciences, vol. 10, No. 24, pp. 1195-1209, 2017, 15 pgs.
(Continued)

*Primary Examiner* — Catherine T. Rastovski
*Assistant Examiner* — Sharad Timilsina
(74) *Attorney, Agent, or Firm* — Morgan, Lewis & Bockius LLP

(57) ABSTRACT

This application is directed to distributed fiber optic sensing particularly across multiple fiber optic ports with multiple corresponding fiber optic paths. A method is implemented to repeatedly a train of optical signals through a fiber optic network including a plurality of optical fibers distributed across a geographic area using at least one optical signal transmitter, sequentially distribute optical signals in the train through the plurality of optical fiber via corresponding optical fiber ports using an optical switching arrangement, receive backscattered optical signals from the plurality of optical fibers demodulate data from the backscattered optical signals, process the data to identify at least some of the low-frequency weight-induced disturbances, and/or sense the backscattered optical signals in a reduced frequency range. The method is useful to detect low frequency weight-induced disturbances for object tracking against high noise clutter in the higher frequency signal bands.

19 Claims, 10 Drawing Sheets

(56) References Cited

U.S. PATENT DOCUMENTS

| | | | |
|---|---|---|---|
| 9,953,524 | B2 | 4/2018 | Xu et al. |
| 9,959,755 | B2 | 5/2018 | Bernhardt et al. |
| 10,393,574 | B2* | 8/2019 | Farhadiroushan .... E21B 47/107 |
| 2010/0158431 | A1 | 6/2010 | Huffman et al. |
| 2011/0069302 | A1 | 3/2011 | Hill et al. |
| 2012/0226452 | A1 | 9/2012 | Hill et al. |
| 2012/0230629 | A1 | 9/2012 | Hill et al. |
| 2013/0301978 | A1* | 11/2013 | Meyer ................ G01D 5/35358 385/12 |
| 2014/0022530 | A1* | 1/2014 | Farhadiroushan .... E21B 47/095 356/35.5 |
| 2016/0252414 | A1 | 9/2016 | Preston et al. |
| 2016/0300150 | A1 | 10/2016 | Watts-Fitzgerald et al. |
| 2017/0184426 | A1* | 6/2017 | Geiger ..................... G01M 3/38 |
| 2017/0205253 | A1* | 7/2017 | Handerek ............ G01D 5/3539 |
| 2018/0058197 | A1* | 3/2018 | Barfoot ................... E21B 47/00 |
| 2018/0174443 | A1 | 6/2018 | Fowe et al. |
| 2018/0174445 | A1 | 6/2018 | Rolf |
| 2018/0180766 | A1* | 6/2018 | Therrien ................ G01V 1/226 |

FOREIGN PATENT DOCUMENTS

| | | |
|---|---|---|
| EP | 3140630 A1 | 3/2017 |
| EP | 3172533 A2 | 5/2017 |
| EP | 3289317 A1 | 3/2018 |
| EP | 3384253 A1 | 10/2018 |
| GB | 2442745 B | 4/2008 |
| JP | 2003344148 A | 12/2003 |
| JP | 2009189655 A | 8/2009 |
| JP | 2010515094 A | 5/2010 |
| WO | WO2015/158926 A1 | 10/2015 |
| WO | WO/2016/012760 A2 | 1/2016 |
| WO | WO/2018/045433 A1 | 3/2018 |
| WO | WO/2018/085893 A1 | 5/2018 |
| WO | WO/2018/154275 A1 | 8/2018 |

OTHER PUBLICATIONS

B, Jiang and Y. Fei, "Vehicle Speed Prediction by Two-Level Data Driven Models in Vehicular Networks," IEEE Transactions on Intellectual Transportation Systems, vol. 18, No. 7, pp. 1793-1801, 2017, 9 pgs.

C. deFabritiis, R. Ragona, and G. Valenti, "Traffic Estimation and Prediction Based on Real Time Floating Car Data," in Proceedings of the 11th International IEEE Conference on Intelligent Transportation Systems, pp. 197-203, 2008, 7 pgs.

Englund, Mark Andrew, International Search Report and Written Opinion, PCT/AU2019/051249, Jan. 20, 2020, 6 pgs.

Englund, Mark Andrew, International Preliminary Report on Patentability, PCT/AU2019/051249, May 18, 2021, 9 pgs.

Fiber Sense Limited, Extended European Search Report, EP19885626.2, Jul. 1, 2022, 11 pgs.

J. Tang, F. Liu, Y. Zou, W. Zhang, and Y. Wang, "An improved fuzzy neural network for traffic speed prediction considering periodic characteristic," IEEE Transactions on Intelligent Transportation Systems, vol. 18, No. 9, pp. 2340-2350, 2017, 11 pgs.

M. Fouladgar, M. Parchami, R. Elmasri, and A. Ghaderi, "Scalable deep traffic flow neural networks for urban traffic congestion prediction," in Proceedings of 2017 International Joint Conference on Neural Networks, pp. 2251-2258, 2017, 8 pgs.

N. G. Polson and V. O. Sokolov, "Deep learning for short-term traffic flow prediction," Transportation Research Part C, vol. 79, pp. 1-17, 2017, 17 pgs.

X. Ma, Z. Tao, Y. Wang, H. Yu, and Y. Wang, "Long short-term memory neural network for traffic speed prediction using remote microwave sensor data," Transportation Research Part C, vol. 54, No. 2015, pp. 187-197, 2015, 11 pgs.

Y. Lv, Y. Duan, W. Kang, Z. Li, and F.Y. Wang, "Traffic flow prediction with big data: a deep learning approach," IEEE Transactions on Intellectual Transportation Systems, vol. 16, No. 2, pp. 865-873, 2015, 9 pgs.

Fiber Sense Limited, Communication Pursuant to Article 94(3), EP17869895.7, Apr. 12, 2023, 47 pgs.

Notice of Reasons for Refusal, CN2021-526397, Nov. 7, 2023, 11 pgs.

Fiber Sense Limited, Communication Pursuant to Article 94(3), EP19885626.2, Apr. 21, 2023, 9 pgs.

Fiber Sense Limited, Intent to Grant, EP19885626.2, Nov. 23, 2023, 8 pgs.

Fiber Sense Limited, Examination Report No. 1 for Standard Patent Application, AU2019380874, May 31, 2024, 4 pgs.

* cited by examiner

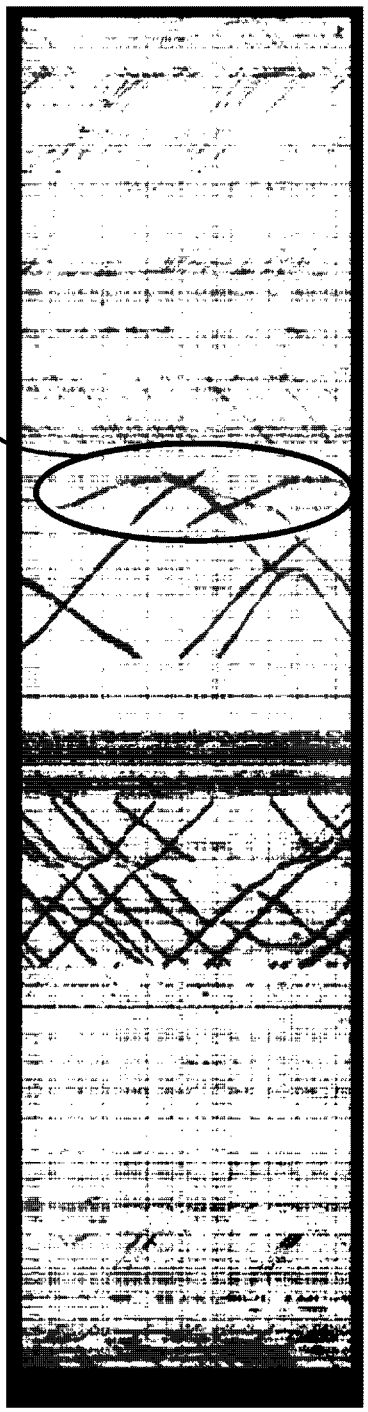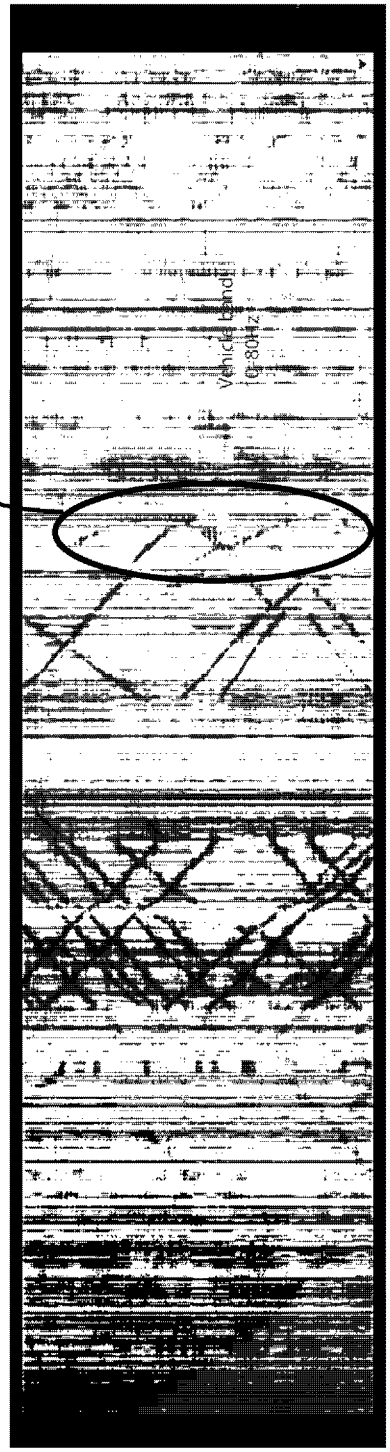

METHOD AND SYSTEM FOR DISTRIBUTED FIBRE OPTIC SENSING

This application is a National Stage application of International Application No. PCT/AU2019/051249, filed Nov. 13, 2019, titled "Method and System for Distributed Fiber Optic Sensing," which claims priority to Australian Patent Application No. 2018904319, filed Nov. 13, 2018, tilted "Method and System for Distributed Fiber Optic Sensing." Each of the above referenced patent applications is herein incorporated by reference in its entirety.

FIELD OF THE INVENTION

The present disclosure generally relates to a method and system for distributed fibre optic sensing in particular across multiple fibre optic ports with multiple corresponding fibre optic paths.

BACKGROUND OF THE INVENTION

Fibre-optic distributed acoustic sensing can detect acoustic events in surrounding regions along an optical fibre. An acoustic event can be caused by incidents such as underground digging near a gas pipe, water pipe or a power cable, or pedestrian and road traffic activities. Different types of incidents may cause different acoustic signatures in respect of the acoustic event. Monitoring of acoustic events therefore allows for alerts to be generated for the prevention or identification of these incidents, or for tracking of road users in the case of pedestrian and road traffic.

The conventional and intuitive approach for acoustic detection is to identify the acoustic signature of an object or range of objects, identifying the frequency band that corresponds to the highest energy for such objects and then setting detectors in that frequency band. By way of example in the case of vehicles a typical high energy band, dominated by tyre noise, is 10-80 Hz. In dense acoustic environments such as in urban environments many other ambient noises occupy this band which results in a low signal-to-noise ratio despite the relatively high amplitude of the signal.

In addition, for higher frequency bandwidth detection a corresponding high sampling rate is required. This limits the capacity of optical transmitters and receivers in particular to service more than one fibre optic path.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the disclosure there is provided a system for distributed fibre sensing across a fibre optic network including a plurality of optical fibres distributed across a geographic area, the system including:
  an optical signal transmitter arrangement comprising at least one optical signal transmitter for repeatedly transmitting a train of optical signals through the fibre optic network;
  an optical switching arrangement for sequentially distributing optical signals in the train through the plurality of optical fibres via corresponding optical fibre ports;
  an optical signal receiver arrangement comprising at least one corresponding optical signal receiver for receiving backscattered optical signals from the plurality of optical fibres, the backscattered optical signals being influenced by disturbances that induce fibre optic sensing signals; and
  a processor for demodulating data from the backscattered optical signals, and processing the data to identify the disturbances; wherein the bandwidth or frequency range of the at least one optical signal receiver is configured to sense backscattered optical signals in a reduced frequency range selected from at least one of 0-100 Hz, 0-80 Hz, 0-60 Hz, 0-40 Hz, 0-30 Hz, 0-20 Hz or 0-2 Hz, thereby reducing the corresponding required sampling rate and increasing the predetermined multiplex or switching ratio or the number of optical fibre ports serviced per optical signal transmitter/receiver.

In some embodiments, the optical switching arrangement may include at least one optical switch for servicing the plurality of optical fibre ports at a predetermined switching or multiplex ratio.

In some embodiments, the optical receiver arrangement may comprise a plurality of optical signal receivers, the plurality of optical signal receivers being configured to receive the backscattered optical signals from the corresponding optical fibres. At least one of the plurality of optical fibres may be an optical trunk fibre which includes an additional optical switching arrangement for sequentially distributing optical signals in a signal train through a plurality of optical branch fibres via corresponding optical fibre ports. A plurality of the optical fibres may be optical trunk fibres, each of which may include additional optical switching arrangements for sequentially distributing optical signals in a signal train through a plurality of optical branch fibres via corresponding optical fibre ports. The optical signal receivers may be configured to receive the backscattered optical signals from the trunk fibres via the branch fibres.

In some embodiments, the predetermined switching or multiplex ratio may be selected from a group including 4, 6, 8 and 16.

According to a second aspect of the disclosure there is provided a system for distributed fibre sensing across a fibre optic network including a plurality of optical fibres distributed across a geographic area, the system including:
  an optical signal transmitter arrangement comprising at least one optical signal transmitter for repeatedly transmitting a train of optical signals through the fibre optic network;
  an optical signal receiver arrangement comprising at least one corresponding optical signal receiver for receiving backscattered optical signals from the plurality of optical fibres, the backscattered optical signals being influenced by disturbances that induce fibre optic sensing signals, including low frequency weight-induced disturbances; and
  a processor for demodulating data from the backscattered optical signals, and processing the data to identify at least some of the low-frequency weight-induced disturbances.

In some embodiments, the low frequency weight-induced disturbances may be in the frequency range of 0-2 Hz.

In some embodiments, the bandwidth or acoustic frequency range of the at least one optical signal receiver may be configured to sense backscattered optical signals selected from a frequency range of at least one of 0-20 Hz, 0-30 Hz, 0-80 Hz, 0-100 Hz, 0-250 Hz and 0-1250 Hz. In some embodiments, the fibre optic sensing signals may include higher frequency acoustic signals derived from higher frequency acoustic disturbances, the processor being configured to demodulate data from the backscattered optical signals and to process the data to identify at least some of the higher frequency acoustic disturbances in conjunction with the weight-induced disturbances. The higher frequency acoustic disturbances may be greater than 2 Hz. The higher frequency acoustic disturbances may correspond to at least one of 2-1250 Hz, 2-100 Hz, 2-80 Hz, 10-1250 Hz, 10-100 Hz, 10-80 Hz, 20-80 Hz, and 40-80 Hz.

In some embodiments, the lower frequency acoustic disturbances and the higher frequency acoustic disturbances may be correlated to extract additional data in respect of objects which are the source of both disturbances.

According to a third aspect of the disclosure there is provided a method for distributed fibre sensing across a fibre optic network including a plurality of optical fibres distributed across a geographic area, the method including:
  repeatedly transmitting a train of optical signals through the fibre optic network using at least one optical signal transmitter;
  sequentially distributing optical signals in the train through the plurality of optical fibres via corresponding optical fibre ports;
  receiving backscattered optical signals from the plurality of optical fibres using at least one optical receiver, the backscattered optical signals being influenced by any disturbances that induce fibre optic sensing signals; and
  demodulating data from the backscattered optical signals, and processing the data to identify the disturbances;
  sensing backscattered optical signals in a reduced frequency range selected from at least one of 0-100 Hz, 0-80 Hz, 0-60 Hz, 0-40 Hz, 0-30 Hz, 0-20 Hz, 0-2 Hz, or less than 0-2 Hz, thereby reducing the corresponding required sampling rate and increasing the predetermined multiplex or switching ratio or the number of optical fibre ports serviced per optical signal transmitter/receiver.

According to a fourth aspect of the disclosure there is provided a method for distributed fibre sensing across a fibre optic network including a plurality of optical fibres distributed across a geographic area, the method including:
  repeatedly transmitting a train of optical signals through the fibre optic network;
  receiving backscattered optical signals from the plurality of optical fibres, the backscattered optical signals being influenced by disturbances that induce fibre optic sensing signals, including low frequency weight-induced disturbances; and
  demodulating data from the backscattered optical signals, and processing the data to identify at least some of the low-frequency weight-induced disturbances.

In some embodiments, the low frequency weight-induced disturbances may be in the low frequency range of 0-2 Hz.

In some embodiments, the bandwidth or acoustic frequency range of the at least one optical signal receiver is configured to sense backscattered optical signals selected from a frequency range of at least one of 0-20 Hz, 0-30 Hz, 0-80 Hz, 0-100 Hz, 0-250 Hz and 0-1250 Hz.

In some embodiments, the fibre optic sensing signals include higher frequency acoustic signals derived from higher frequency acoustic disturbances in excess of 2 Hz, the method including demodulating data from the backscattered optical signals, and processing the data to identify at least some of the higher frequency acoustic disturbances in conjunction with the weight-induced disturbances.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIGS. 7A and 7B illustrate another example of the comparison between 0-2 Hz (DC-type) band and 10-80 Hz band regarding density plot of electrical signals generated by the system over time.

DETAILED DESCRIPTION OF EMBODIMENTS

The disclosed system and method make use of fibre optic distributed acoustic sensing to provide spatial and temporal surveillance and monitoring data within a geographical area, such as a city, utilising an array of optical fibres distributed across the geographical area. Such a sensing technique relies on the occurrence of a nearby acoustic event causing a corresponding local perturbation of refractive index along an optical fibre. The required proximity of the acoustic event depends on noise floor of the sensing equipment, the background noise, and the acoustic properties of the medium or media between the acoustic event and the optical fibre. Due to the perturbed refractive index, an optical interrogation signal transmitted along an optical fibre and then back-scattered in a distributed manner (e.g. via Rayleigh back scattering or other similar scattering phenomena) along the length of the fibre will manifest in fluctuations (e.g. in intensity and/or phase) over time in the reflected light. The magnitude of the fluctuations relates to the severity or proximity of the acoustic disturbance. The timing of the fluctuations along the distributed back-scattering time scale relates to the location of the acoustic event.

Reference to fibre optic sensing signals in this disclosure should be read as including any propagating wave or signal that imparts a detectable change in the optical properties of the sensing optical fibre, generally by inducing strain in the fibre and a resultant change in refractive index. These propagating signals detected in the system may include signal types in addition to conventional acoustic signals such as low frequency seismic waves, other low frequency vibrations, and slowly varying and very low frequency (DC-type) signals such as weight-induced compression waves that induce for example localised strain changes in the optical fibre.

Figure 1A:
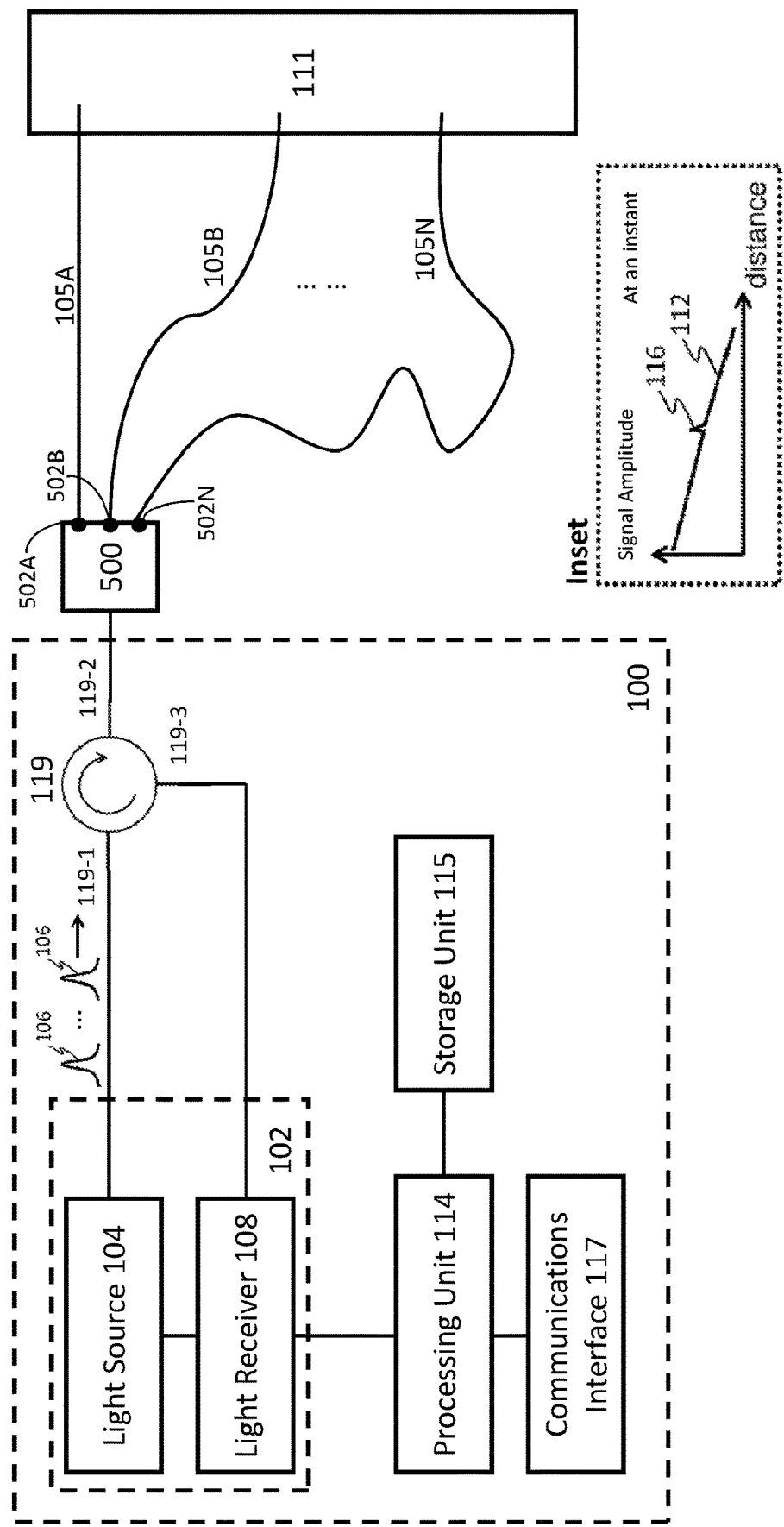
FIG. 1A illustrates a schematic block diagram of an example of a system for distributed acoustic sensing with a single receiver.

In one high level example, a system 100 for use in distributed fibre sensing (DFS) is illustrated in FIG. 1A. The DFS system 100 includes a transceiver, for example, a coherent optical time-domain reflectometer (C-OTDR) 102. The C-OTDR 102 includes a light source 104 to emit an optical interrogation field 106 in the form of an optical pulse train containing a plurality of optical pulses.

The C-OTDR 102 may include or connect to an optical circulator 119 configured to direct light from the light source 104 through a port 119-1 to a port 119-2. The optical circulator 119 also directs the back reflected light through the port 119-2 to a port 119-3. The reflected light output from the port 119-3 is provided to a light receiver 108 included in the C-OTDR 102. It will be appreciated that other devices may be used for connecting the optical signal receiver and the optical fibre, including but not limited to optical couplers and array waveguide gratings.

The light receiver 108 is in the form of a photodetector configured to detect the reflected light 110 scattered in a distributed manner and produce a corresponding electrical signal 112 with an amplitude proportional to the reflected optical intensity resolved over time. The time scale may be translated to a distance scale relative to the receiver 108. An inset in FIG. 1A illustrates a schematic plot of such signal amplitude over distance at one particular instant.

The DFS system 100 also includes a processing unit 114, within or separate from the C-OTDR 102, configured to process the fluctuations 116 in the electrical signal 112. These fluctuations are signals that contain a number of different frequencies at any one point and also along a series of different spatial points that the processing unit will convert to a digital representation of the nature and movement of the acoustic and other disturbances around the fibre optic grid.

The digitised electrical signal 112, any measured fluctuations 116 and/or processed data associated therewith may be stored in a storage unit 115. The storage unit 115 may include volatile memory, such as random access memory (RAM) for the processing unit 114 to execute instructions, calculate, compute or otherwise process data. The storage unit 115 may further include non-volatile memory, such as one or more hard disk drives for the processing unit 114 to store data before or after signal-processing and/or for later retrieval. The processing unit 114 and storage unit 115 may be distributed across numerous physical units and may include remote storage and potentially remote processing, such as cloud storage, and cloud processing, in which case the processing unit 114 and storage unit 115 may be more generally defined as a cloud computing service.

In addition or as an alternative to the raw acoustic and other data derived from the fibre optic sensed signals being stored, raw optical signals may be digitised by an A/D converter and stored as raw optical data. Whilst this will require substantially more storage capacity it has the advantage of preserving the integrity of all of the backscattered optical signals/data without losing resolution as a result of sampling frequencies and the like, and retaining all time and location-based data. This stored optical data may then be retrieved for analysis at a later stage. If stored, the optical data can be retrieved, processed and re-processed to provide new acoustic and other data for analysis. The system 100 may include a communications interface 117 (e.g. wireless or wired) to receive a search request from one or more remote mobile or fixed terminals.

An optical switch 500 is configured to couple light between the DFS unit 100 and any one of multiple optical fibre installations (105A, 105B and 105N) via respective optical fibre ports 502A, 502B and 502C. The fibre installations or paths may terminate at one or more fibre path termination areas 111. In one configuration, the optical switch 500 time-multiplexes the optical pulse train 106 sequentially through the multiple optical fibre ports 502A to 502N and corresponding optical fibre paths 105A to 105N. Accordingly, the pulse rate per optical fibre path equals the source rate of the pulse train 106 divided by N where N is the number of optical fibre paths. The decreased pulse rate will result in a corresponding reduction in the optical signal-to-noise ratio (OSNR) of the signal detected on each optical fibre installation.

Figure 1B:
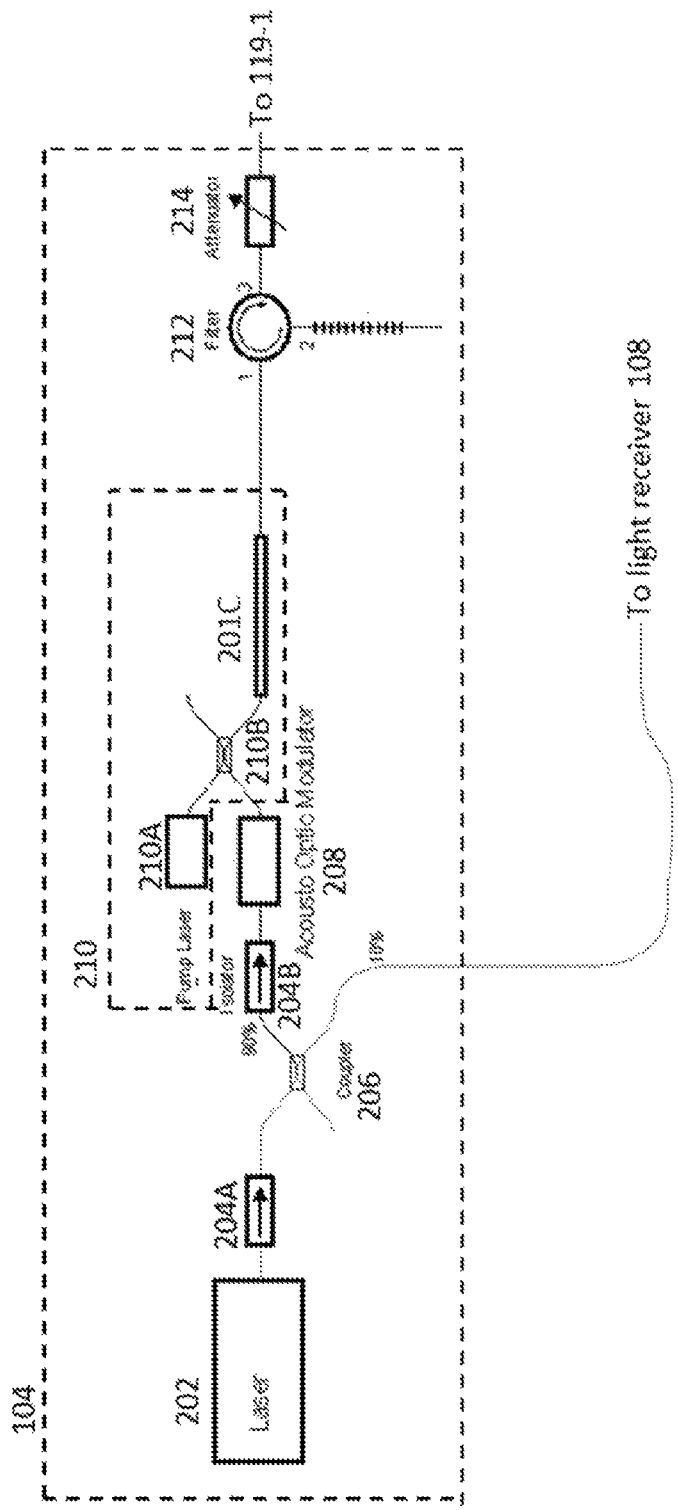
FIG. 1B illustrates a more detailed schematic view of an embodiment of an optical transmitter forming part of the system of FIG. 1.

FIG. 1B illustrates a more detailed arrangement of the light source or optical transmitter 104. The light source 104 includes a laser 202, for example, a distributed feedback laser (DFB), which directs a laser beam through a first isolator 204A. In one arrangement, a portion of light from the laser 202 is provided to the light/optical receiver 108 as a reference signal for processing purposes. For example, the light from the laser 202 may enter a coupler for example, a 90/10 optical coupler 206, where 10% of the light is provided to the light receiver 108 via the direct path and the remaining portion (90%) of the light is provided to an acousto-optic modulator 208 via a second isolator 204B. The acousto-optic modulator 208 is configured to control the power, frequency, phase and/or spatial direction of light. Various types of modulators may be used, including but not limited to acousto-optic modulators and electro-optic modulators such as Lithium Niobate electro-optic modulators.

The modulated outgoing signal may then be provided to an optical amplifier 210, resulting in an overall amplification of the modulated signal to extend the reach of interrogation signals. While only one stage of the optical amplifier is illustrated, a multi-stage optical amplifier may be incorporated in other embodiments. In one example, the optical amplifier 210 may include an optical coupler 210B to couple a pump laser 210A with the modulated signal for Raman amplification with the transmission path. A photon-to-photon interaction between the pump wavelength and the signal wavelength occurs within the fibre, resulting in emission of a signal photon and thus providing amplification of the signal. In another example, the optical amplifier 210 may be an Erbium doped fibre amplifier (EDFA) comprising a pump source 210A, a coupler 210B and an optical fibre 210C doped with a rare earth dopant such as Erbium. The output of the optical amplifier 210 may be provided to an optical filter 212 to filter out the outgoing modulated signal. An optical attenuator 214 may be used to adjust the power of the outgoing light.

Figure 1C:
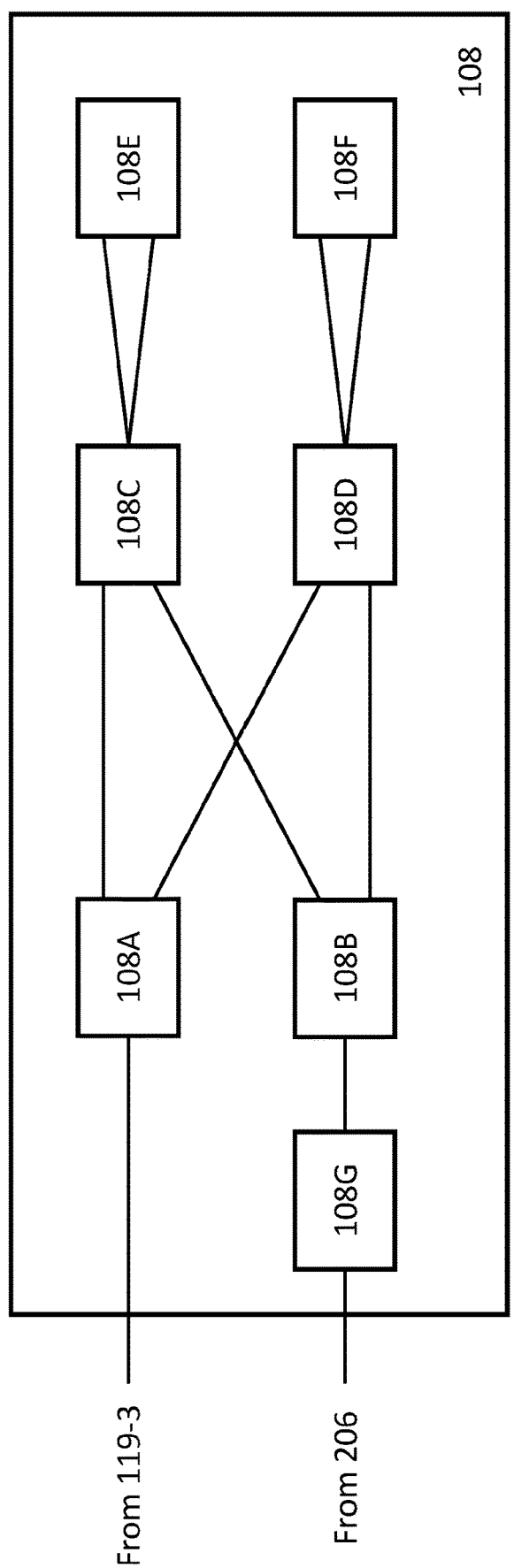
FIG. 1C illustrates a schematic view of an embodiment of an optical receiver.

FIG. 1C illustrates an arrangement of the single light or optical receiver 108. The optical receiver 108 may include a 45 degree polarisation beam splitter 108G from the coupler 206, optical couplers (108A, 108B, 108C and 108D) and light detectors (108E and 108F). The optical coupler 108A may split the received reflected light from the circulator port 119-3 into two 45 degree polarised portions each provided to the optical coupler 108C and the optical coupler 108D, respectively. The optical coupler 108B may split the reference signal via the 45 degree polarisation beam splitter 108G obtained directly from the light source 104 into two portions each provided to the optical couplers 108C and 108D as illustrated in FIG. 1C. In one example, the optical couplers 108C and 108D may be 3 dB couplers, which may respectively combine two inputs (one is the portion of the received reflected light and the other is the portion of the reference signal) and output the combination of two inputs through two ports. The two outputs of the optical coupler 108C are provided to the light detector 108E and the two outputs of the optical coupler 108D are provided to the light detector 108F. The optical detector (108E and/or 108F) may be a photodetector.

Figure 2:
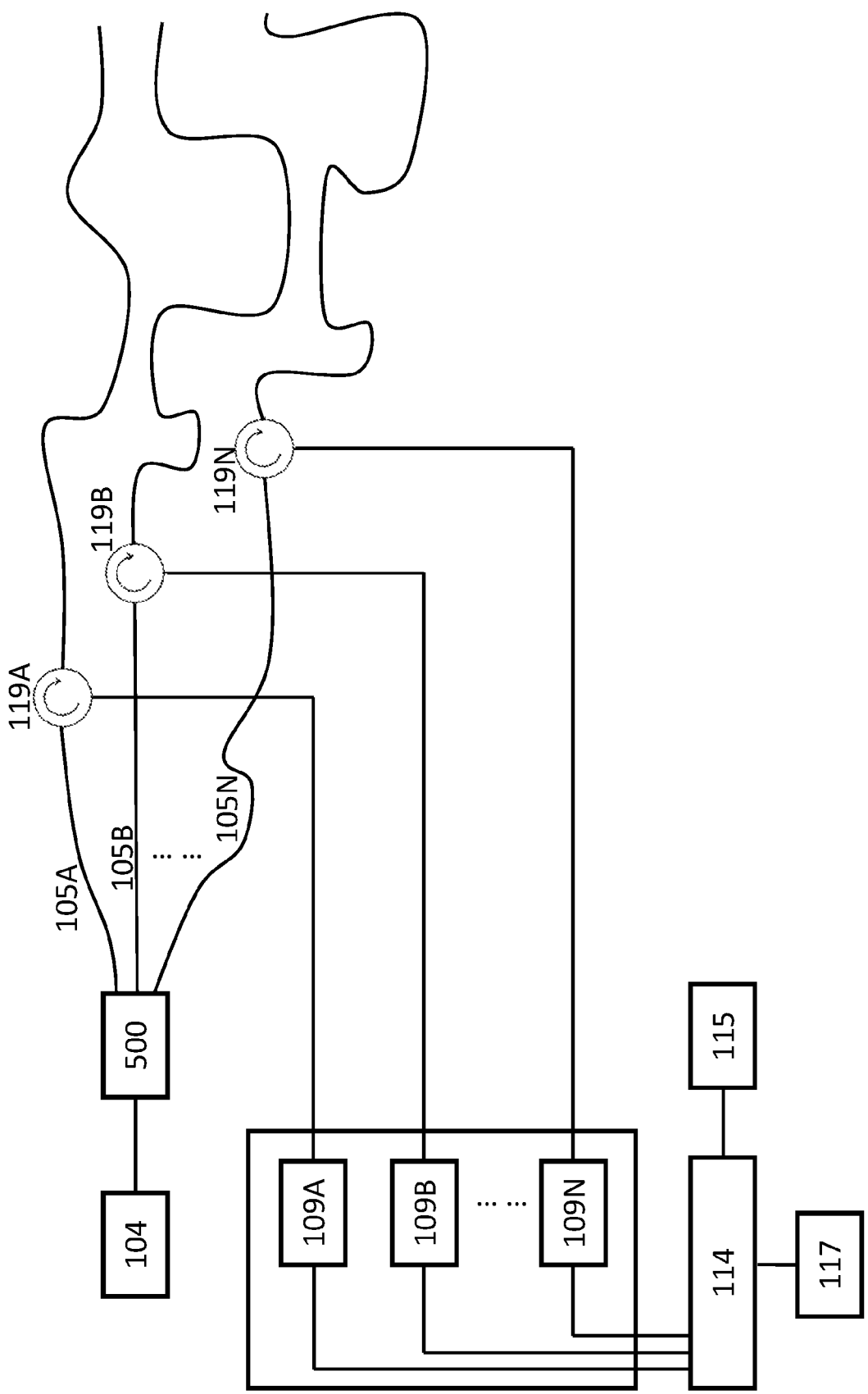
FIG. 2 illustrates a schematic view of another example of a distributed acoustic sensing system with multiple receivers.

In another arrangement, the system for distributed acoustic sensing may include multiple optical receivers 109A, 109B, . . . and 109N as illustrated in FIG. 2. Instead of providing the optical circulator 119 before the optical switch 500 as illustrated in FIG. 1A, each of the optical fibre installations (105A, 105B and 105N) may be provided with a corresponding optical circulator (119A, 119B and 119N). The reflected light transmitted through each of the optical fibre installations (105A, 105B and 105N) and output from the corresponding optical circulator (119A, 119B and 119N) is provided to the corresponding optical receiver 109A, 109B and 109N. Each of the optical receivers (109A, 109B and 109N) has a similar architecture to the light receiver 108 as illustrated in FIG. 1C. It would be appreciated by the person skilled in the art that this multi-receiver architecture may enable an increase in the overall incoming and backscattered pulse rate of the system and hence improve the OSNR operated by each optical fibre installation, as each of the optical fibre installations has its own receiving circuit so the backscattered pulses are not limited by time of flight. This is achieved by simply increasing the incoming pulse rate increased by up to tenfold so that the pulse train when sequentially distributed across multiple ports still has a relatively high frequency. With a relatively high pulse rate, potentially exceeding time of flight through the fibre optic cable, a single receiving path would result in outgoing and incoming pulses interfering with one another. Separate receivers with separate return paths would tend to prevent this situation from arising, or at least reduce its likelihood.

Figure 3:
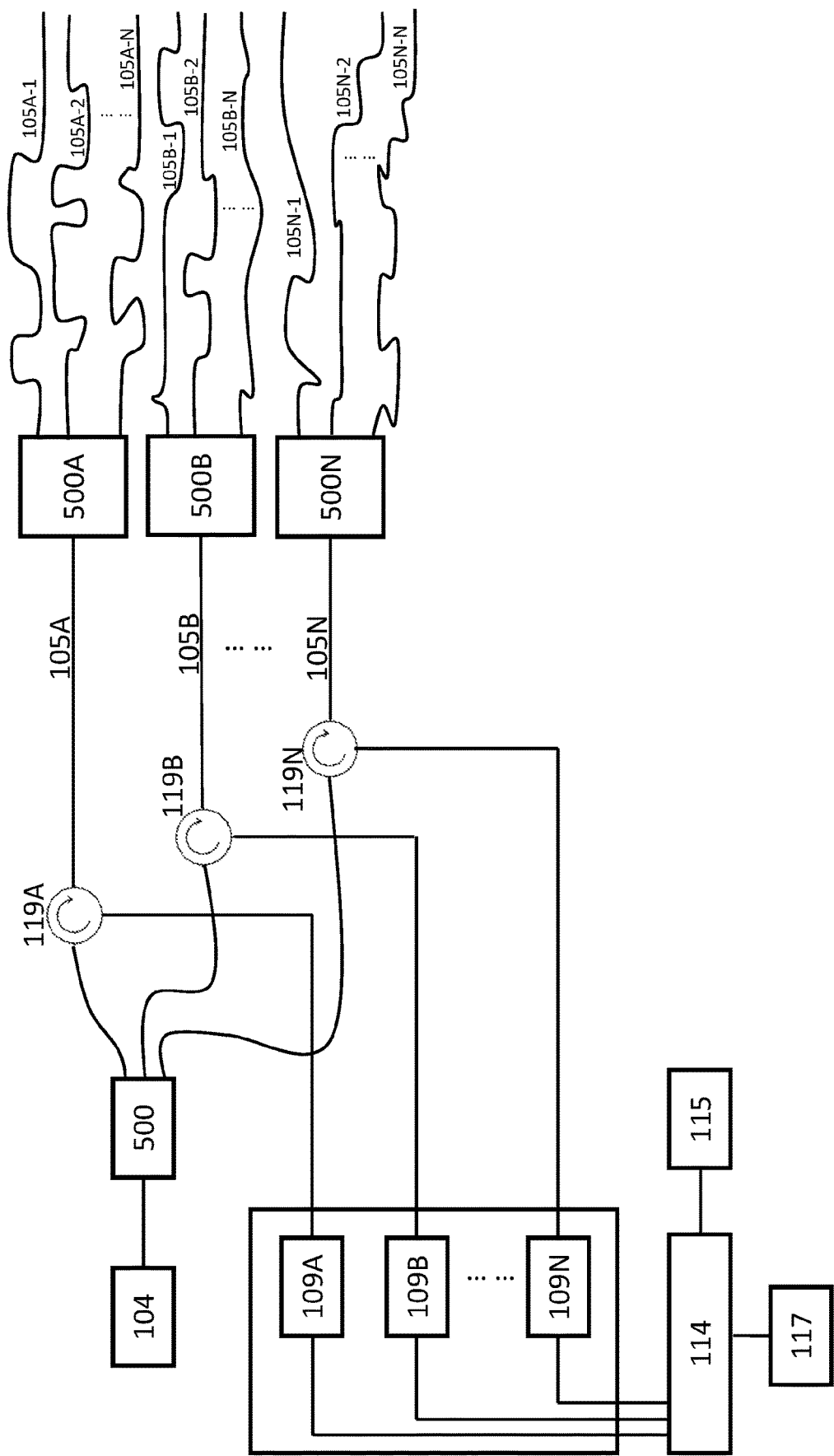
FIG. 3 illustrates a schematic view of another example of a system for distributed acoustic sensing with high port count and multiple receivers.

In another arrangement illustrated in FIG. 3, each of the optical fibre installations (105A, 105B and 105N) may be provided with a corresponding optical switch (500A, 500B and 500N) after the corresponding optical circulator (119A, 119B and 119N) to form a high port count architecture with multiple receivers. Each of the optical switches (500A, 500B and 500N) is configured to couple light between the DFS unit 100 and any one of multiple optical fibre installations, for example, collectively 105A-1, 105A-2 . . . 105A-N are configured with the optical switch 500A and collectively 105N-1, 105N-2 . . . 105N-N are configured with the optical switch 500N. In this arrangement, the person skilled in the art would appreciate that the number of fibre ports may dramatically increase, as a function of the number of switches 500A to 500N multiplied by the number of optical fibre installations 105A-1 to 105A-N per switch, with the number or optical receivers not increasing over those in the FIG. 2 embodiment.

TABLE 1

| Length of fibre (km) | Acoustic frequency Range (Hz) | Acoustic Frequency range required per fibre (Hz) | SNR headroom (dB) (SNR deficit that will still track targets) | Max theoretical number of fibre ports that can be strobed for required frequency range (Nyquist criterion) | No. of optical receivers in sensing node | (All Criteria) Mux ratio per receiver | No. of fibre ports on sensing node | Total fibre lit (km) |
|---|---|---|---|---|---|---|---|---|
| A | B | C | D | E | F | G | H | I |
| 50 | 250 | 250 | 3 | 1.0 | 2 | 1.0 | 2 | 100 |
| 50 | 250 | 100 | 6 | 2.5 | 2 | 2.5 | 5 | 250 |
| 50 | 250 | 30 | 9 | 8.3 | 2 | 7.9 | 16 | 790 |

TABLE 2

| Length of fibre (km) | Acoustic frequency Range (Hz) | Acoustic Frequency range required per fibre (Hz) | SNR headroom (dB) (SNR deficit that will still track targets) | Max theoretical number of fibre ports that can be strobed for required frequency range (Nyquist criterion) | No. of optical receivers in sensing node | (All Criteria) Mux ratio per receiver | No. of fibre ports on sensing node | Total fibre lit (km) |
|---|---|---|---|---|---|---|---|---|
| A | B | C | D | E | F | G | H | I |
| 50 | 250 | 250 | 3 | 1.0 | 4 | 1.0 | 4 | 200 |
| 50 | 250 | 100 | 6 | 2.5 | 4 | 2.5 | 10 | 500 |
| 50 | 250 | 30 | 9 | 8.3 | 4 | 7.9 | 32 | 1580 |

TABLE 3

| Length of fibre (km) A | Acoustic frequency Range (Hz) B | Acoustic Frequency range required per fibre (Hz) C | SNR headroom (dB) (SNR deficit that will still track targets) D | Max theoretical number of fibre ports that can be strobed for required frequency range (Nyquist criterion) E | No. of optical receivers in sensing node F | (All Criteria) Mux ratio per receiver G | No. of fibre ports on sensing node H | Total fibre lit (km) I |
|---|---|---|---|---|---|---|---|---|
| 50 | 250 | 250 | 3 | 1.0 | 6 | 1.0 | 6 | 300 |
| 50 | 250 | 100 | 6 | 2.5 | 6 | 2.5 | 15 | 720 |
| 50 | 250 | 30 | 9 | 8.3 | 6 | 7.9 | 47 | 2370 |

TABLE 4

| Length of fibre (km) A | Acoustic frequency Range (Hz) B | Acoustic Frequency range required per fibre (Hz) C | SNR headroom (dB) (SNR deficit that will still track targets) D | Max theoretical number of fibre ports that can be strobed for required frequency range (Nyquist criterion) E | No. of optical receivers in sensing node F | (All Criteria) Mux ratio per receiver G | No. of fibre ports on sensing node H | Total fibre lit (km) I |
|---|---|---|---|---|---|---|---|---|
| 50 | 250 | 250 | 3 | 1.0 | 16 | 1.0 | 16 | 800 |
| 50 | 250 | 100 | 6 | 2.5 | 16 | 2.5 | 40 | 2000 |
| 50 | 250 | 30 | 9 | 8.3 | 16 | 7.9 | 126 | 6320 |

Tables 1-4 provide examples of how the impact of the lowering of acoustic frequency range required per fibre can substantially reduce the number of optical receivers required in the system, leading to a substantial increase in the total length of fibre lit as a function of the number of receivers. The notional length of each fibre (A) is given as 50 km and the acoustic frequency range of the system at maximum sampling rate (B) is 250 Hz. Column C in each table shows three different acoustic frequency ranges required per fibre, i.e. 250 Hz, 100 Hz, and 30 Hz. The SNR headroom in dB as shown in column D describes the tolerance in the system for reducing the SNR with decreased pulse rate. Significantly it can be seen that for a frequency range per fibre of 250 Hz, there is no SNR headroom (3 dB) to add any fibre ports through a time division multiplexed approach. Accordingly column E shows the maximum theoretical fibre ports calculated based on Nyquist criterion (E≈B/C), which for 250 Hz and 3 dB headroom equates to 1. The number of optical receivers in the system is illustrated in column F, i.e. 2 in Table 1, 4 in Table 2, 6 in Table 3 and 16 in Table 4. Column G summarises the worst case of the number of fibre ports per optical receiver when the maximum theoretical fibre ports (E) compared to the SNR headroom in column D. Accordingly, the number of ports supported by the system (i.e. sensing node) as described in column H is calculated as a function of rounded product of the maximum mux ratio per receiver and the number of the optical receivers in the system, i.e. H≈F×G. The total length of fibres lit by the system is hence calculated as function of the product of the length of each fibre (A) and the total number of fibre ports in the system (H), i.e. I≈A×H.

It can clearly be seem from column C how as the acoustic frequency range per fibre is reduced first to 100 Hz and then to 30 Hz the SNR headroom increase to 6 dB and 9 dB respectively with the reduced bandwidth and noise in the system. The maximum theoretical number of fibre ports that can be strobed increase to 2.5 and 8.3 respectively. With the number of optical receivers being 2 in Table 1 the number of fibre ports in the sensing node increases to 5 and 16 respectively. It can clearly be seen from Tables 2-4 how this number increases proportionally with the number of receivers to 40 and 126 with 16 receivers. The final configuration of Table 4 enables up to 6320 km of fibre to be lit, or using only 16 receivers, which equates to 395 km per receiver. This represents a significant advantage in terms of optimising hardware and resources, especially where existing fibre optic networks are being utilised, so that more extensive and denser coverage may be provided with efficient usage of hardware resources, in particular in terms of km of fibre serviced per receiver.

Figure 4:
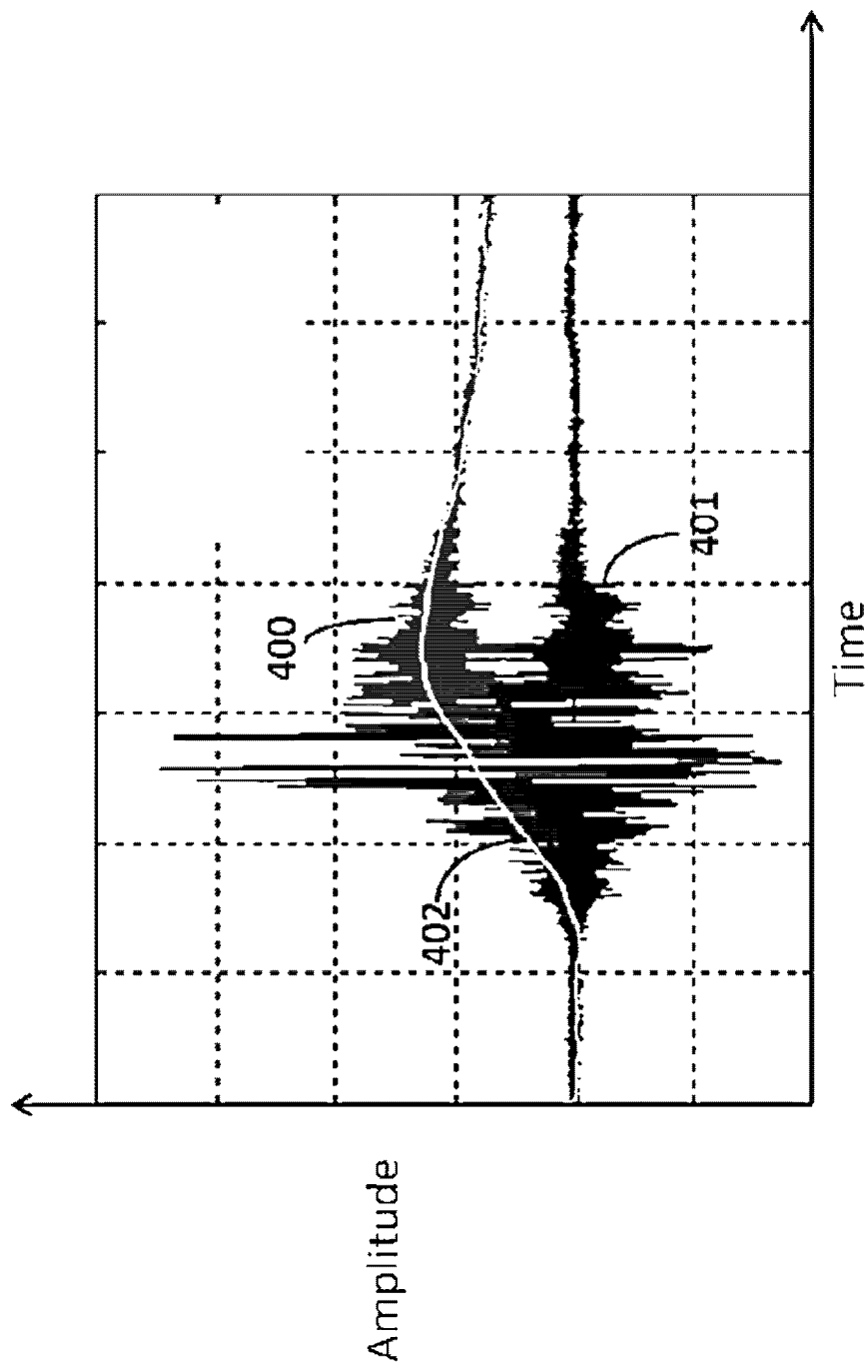
FIG. 4 illustrates a time vs amplitude plot of a raw signal, an AC-type signal and a DC-type signal for a vehicle passing a fixed position along a fibre optic cable.

FIG. 4 illustrates an example of a raw or unfiltered received acoustic signal 400 containing a predominantly AC-type signal 401 (e.g. including frequencies higher or substantially higher than around 2 Hz) and a predominantly DC signal 402 (including frequencies between 0 to around 2 Hz) for a vehicle passing a fixed position along a fibre optic cable. The DC-type band indicates direct strain on the cable which is related to the gross weight induced changes in the region above the fibre optic cable and as a function of product of weight and proximity of the vehicle from the cable.

While the DC band has significantly lower signal amplitude for the vehicle there are virtually no other ambient sound sources in this frequency band to introduce noise and hence to degrade the detection performance. This is in contrast to the higher frequency bands of 10-90 Hz for example where there is a significant amount of ambient noise which will tend to mask the higher frequency signal even though it is greater in amplitude. This may result in a higher signal to noise ratio (SNR) for moving object detection in DC-type band compared to higher frequency AC-type bands, despite the average signal amplitude being lower in the DC band.

Whilst it would be appreciated by the person skilled in the art that the DC-type band may be used for object tracking against high noise clutter in the higher frequency bands, this is counterintuitive in the sense that there is no motivation up front to identify and isolate a lower frequency signal with a substantially lower amplitude. It will be appreciated that the terms AC and DC are borrowed from electrical engineering terminology and relate to whether the current is constant or alternating and thus the frequency content of DC asymptotically approaches zero, generally 0-2 Hz, and that of AC is >2 Hz, typically >40 Hz but may be less (down to 10 Hz or even less for low frequency acoustic signals). The DC frequency range is set considering the signals in this band originate from the movement of the weight of an object over the cable. As such the frequency of the signal is the inverse of the period of time a vehicle for example takes to traverse a given DAS channel. If for example we assume a 10 m channel width then at 60 kph the time it takes for the object to pass is 0.6 s, and the corresponding frequency ranges is in turn of the order <2 Hz. As the vehicle speed increases and the channel width decreases (120 kph at 5 m channel width would result in a time period of 0.15 s and a resultant frequency of about 6.7 Hz). At this frequency it is likely that there would be higher noise levels so the weight-induced signal would be more difficult to pick up than in the 0-2 Hz range, even in the case of high mass vehicles. Conversely slow moving objects are generally easier to pick up even for lower mass objects such as pedestrians, provided the cable is not buried too deeply and the weight or stress transmission properties of the material around the cable are good.

Further, the DC-type signal amplitude for a given moving object may have limited dependence on speed of the moving object, another reason for it not to be chosen, and for the selection of this low frequency band to be counterintuitive. It may however be used to detect and observe relatively heavy objects moving at a low speed, as well as lighter objects in certain conditions as noted above. In contrast, the AC signal amplitudes increase or decrease in proportion to the square of the speed of the moving objects. For example, the same vehicle travelling at a speed of 60 km/h may generate 16 times more tyre noise than the vehicle travelling at a speed of 15 km/h. It would be appreciated by the person skilled in the art that the DC band may accordingly be used for slow and dense traffic, in particular where the higher frequency tyre noise is less pronounced.

Still further, the DC signal amplitude decreases steeply with lateral offset to the fibre optic cable. Measurements in the DC band may be referred to measuring the direct weight (stress) of the objects through strain changes in the optical fibre. The relationship between stress and strain is generally not linear and dependent on the material between the object and the fibre. In an example of a moving vehicle, the AC signal mainly from tyre noise may propagate further than the DC signal. A comparison between the AC band and the DC band for the same object may be used to deduce the distance between the object and the cable, especially in a wide array of possible lateral offset positions, for example, lanes of a highway. A dual sensing arrangement may also be used, where DC sensing is used for sense and slow moving traffic and AC sensing is used for sparser traffic moving at a greater speed. Both AC and DC signals can be simultaneously extracted and processed for an optimal result. These are processed through a Fast Fourier transform to isolate the frequencies in the DC bands (e.g. 0-0.2 Hz, 0-2 Hz) and AC bands (e.g. 2 Hz-20 Hz, 10 Hz-80 Hz or any other selected AC band for example 10-1250 Hz or 40-1250 Hz or 40-80 Hz). The optimal frequency ranges are a function of the sensing optical fibre position and the transmission properties of the materials in the vicinity of the sensing fibres. The optimal ranges are also related to the nature of the strain coupling transfer function from the object generating the disturbance and the sensing fibre. The two outputs may then be summed or otherwise combined to optimise the output signal for a particular location. The DC signal will generally provide better accuracy for close up location whereas the AC signal will provide a more generalised location which may be more useful in the case of more distant objects.

In addition, slow moving and heavy objects such as excavators can be effectively tracked especially in the vicinity of critical infrastructure like pipelines, and acoustic AC signals from digging as well as DC signals as a function of weight and distance can be sensed and monitored. The person skilled in the art would also appreciate that the DC band is practical for other heavy and slow moving applications such as tracking aircraft taxiing on runways. Despite significant noise from the engines of aircraft, the acoustic coupling from engine through air to ground and further to optical fibres is relatively weak compared to direct modulation of the strain of the optical fibre from the weight of the aircraft through its wheels.

Figure 5A:
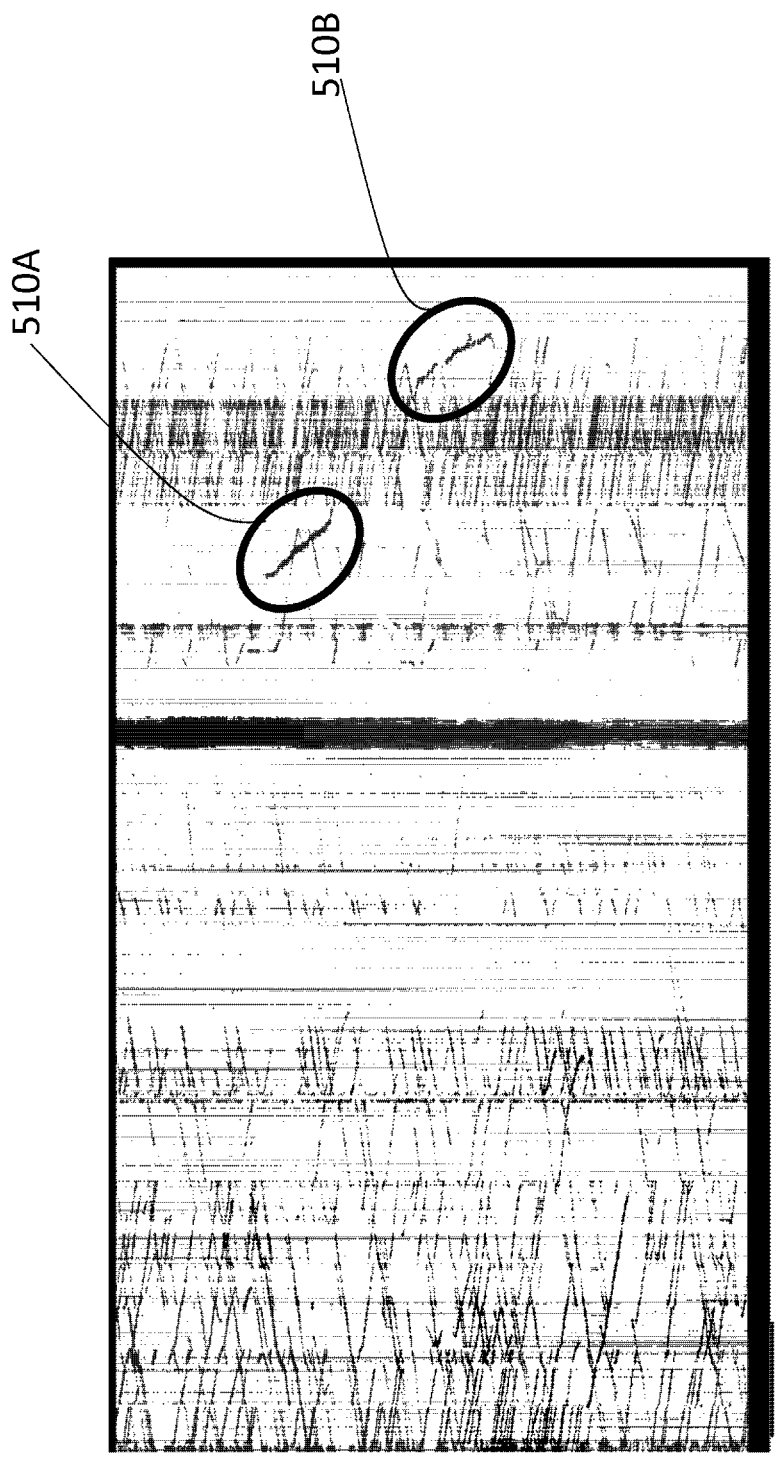
FIGS. 5A and 5B illustrate some examples of density plots of electrical signals generated by the system over time in a 0-2 Hz band.
Figure 5B:
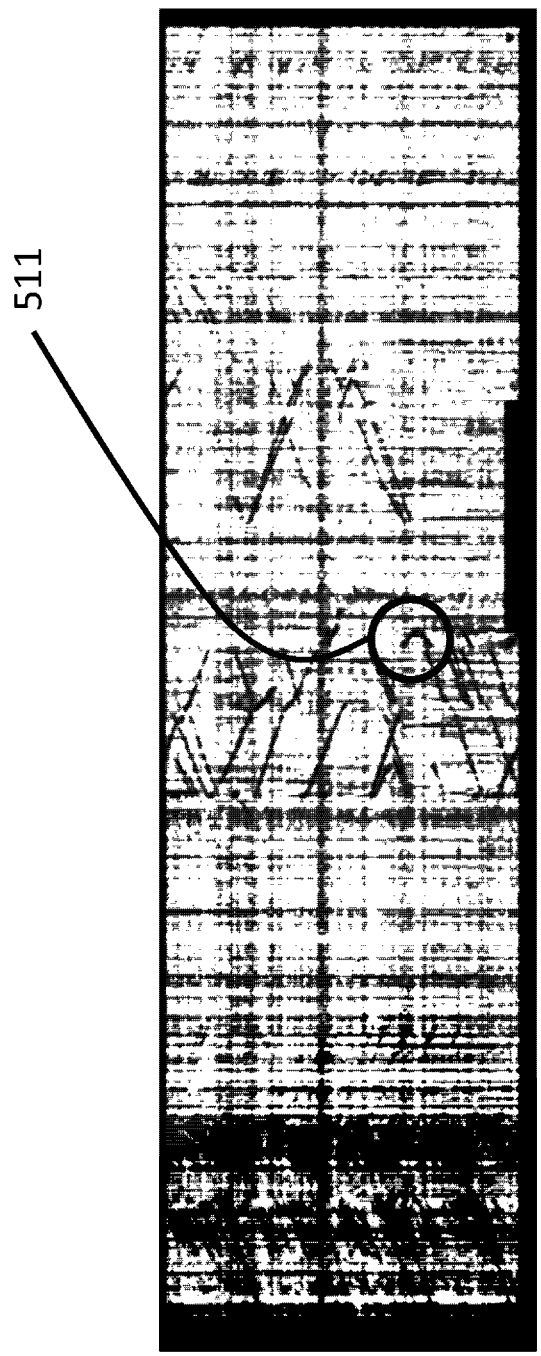
Figure 6A:
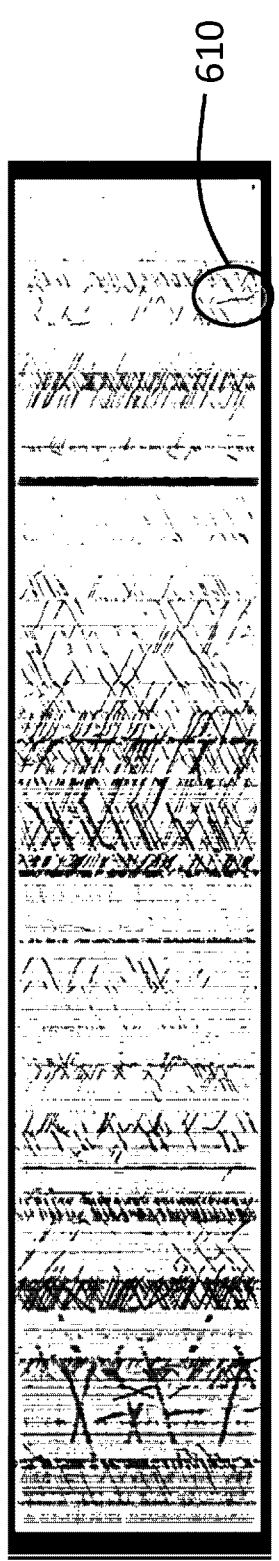
FIGS. 6A, 6B and 6C illustrate examples of density plots of electrical signals generated by the system over time in a 0-2 Hz band, a 2-20 Hz band and a 20-250 Hz band, respectively.
Figure 6B:
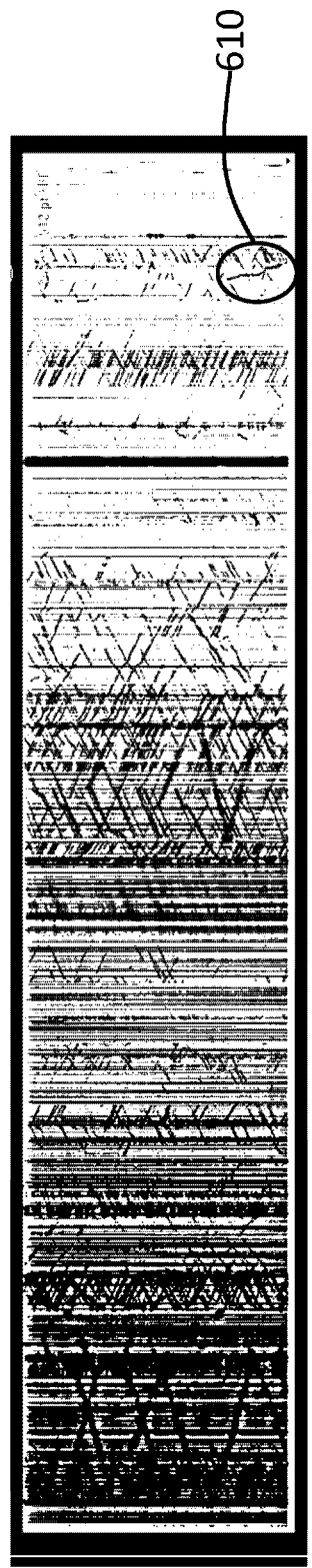
Figure 6C:
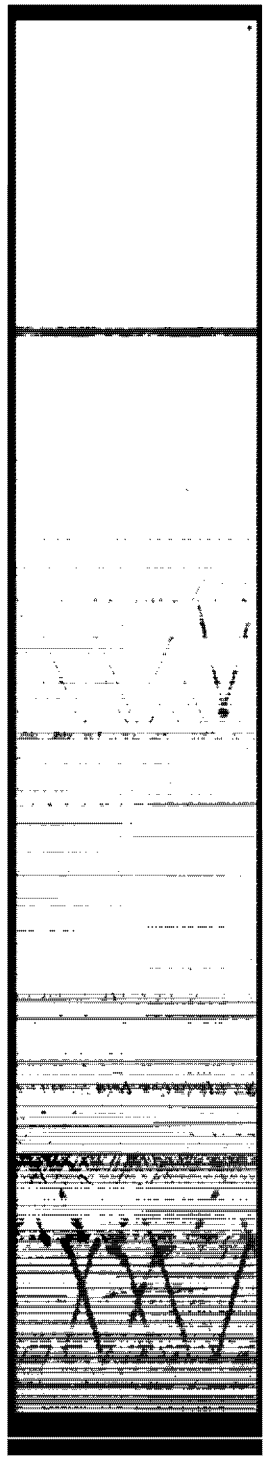

FIGS. 5A and 5B illustrate some examples of density plots of electrical signals generated by the system over time in the 0-2 Hz DC-type band to demonstrate the detection capability of the DC band. In the figures, features such as traces of straight lines with relatively constant gradients are associated with objects moving at a relatively constant speed (with the gradients being indicative of speed) that cause the relevant acoustic events detected by the DFS unit 100. FIG. 5A clearly shows traces 510A and 510B of a slow moving object against background traffic with high SNR, which is observed as a garbage truck at a speed of 3 km/h. In another example of the DC band, FIG. 5B provides a trace 511 of a car doing U-turn slowly. FIGS. 6A, 6B and 6C illustrate examples of density plots of electrical signals generated by the system over time at the 0-2 Hz band, 2-20 Hz band and 20-250 Hz band, respectively. The comparison shows that the slowly moving object providing a trace 610 has a higher SNR in the DC band compared to higher frequency bands (i.e. the AC bands). FIGS. 7A and 7B illustrate other examples of density plots of electrical signals generated by the system over time at 0-2 Hz band and 10-80 Hz band, respectively. As illustrated, the slowly moving objects providing relatively vertical traces 710 have higher SNRs in the DC band (0-2 Hz) compared to the higher frequency bands.

It will be understood that the invention disclosed and defined in this specification extends to all alternative combinations of two or more of the individual features mentioned or evident from the text, examples or drawings. All of these different combinations constitute various alternatives of the present disclosure.

The invention claimed is:

1. A system for distributed fiber sensing across a fiber optic network including a plurality of optical fibers distributed across a geographic area, the system including:
   an optical signal transmitter arrangement comprising at least one optical signal transmitter for repeatedly transmitting a train of optical signals through the fiber optic network;
   an optical signal receiver arrangement comprising at least one corresponding optical signal receiver for receiving backscattered optical signals from the plurality of optical fibers; and
   a processor for demodulating data from the backscattered optical signals, and processing the demodulated data to:
      identify a weight-induced compression wave in the backscattered optical signals that induces a localized strain change in an optical fiber in the fiber optic network; and detect presence of an object passing a fixed position along the optical fiber based on the identified weight-induced compression wave, wherein the weight-induced compression wave is in a low frequency range of 0-2 Hz.

2. The system of claim 1, further comprising an optical switching arrangement for sequentially distributing the train of optical signals through the plurality of optical fibers via a plurality of optical fiber ports, wherein the optical switching arrangement includes at least one optical switch for servicing the plurality of optical fiber ports at a predetermined switching or multiplex ratio.

3. The system of claim 1, wherein the optical signal receiver arrangement comprises a plurality of optical signal receivers, the plurality of optical signal receivers being configured to receive the backscattered optical signals from the plurality of optical fibers.

4. The system of claim 3, wherein at least one of the plurality of optical fibers is an optical trunk fiber which includes an additional optical switching arrangement for sequentially distributing optical signals in a signal train through a plurality of optical branch fibers via corresponding optical fiber ports.

5. The system of claim 4, wherein a plurality of the optical fibers are optical trunk fibers, each of which includes additional optical switching arrangements for sequentially distributing optical signals in a signal train through a plurality of optical branch fibers via corresponding optical fiber ports, wherein the optical signal receivers are configured to receive the backscattered optical signals from the optical trunk fibers via the optical branch fibers.

6. The system of claim 2, wherein the predetermined switching or multiplex ratio is selected from a group including 4, 6, 8 and 16.

7. The system of claim 1, wherein the backscattered optical signals include higher frequency acoustic signals derived from higher frequency acoustic disturbances, the processor being configured to demodulate data from the backscattered optical signals, and to process the data to identify at least some of the higher frequency acoustic signals in conjunction with the weight-induced compression wave.

8. The system of claim 7, wherein the higher frequency acoustic signals are greater than 2 Hz.

9. The system of claim 8, wherein the higher frequency acoustic signals correspond to at least one of 2-1250 Hz, 2-100 Hz, 2-80 Hz, 10-1250 Hz, 10-100 Hz, 10-80 Hz, 20-80 Hz, and 40-80 Hz.

10. The system of claim 9, wherein the weight-induced compression wave and the higher frequency acoustic signals are correlated to extract additional data in respect of objects which are a source of both disturbances.

11. A method for distributed fiber sensing across a fiber optic network including a plurality of optical fibers distributed across a geographic area, the method including:
repeatedly transmitting a train of optical signals through the fiber optic network;
receiving backscattered optical signals from the plurality of optical fibers; and
demodulating data from the backscattered optical signals, and processing the data to:
identify a weight-induced compression wave in the backscattered optical signals that induces a localized strain change in an optical fiber in the fiber optic network; and
detect presence of an object passing a fixed position along the optical fiber based on the identified weight-induced compression wave, wherein the weight-induced compression wave is in a low frequency range of 0-2 Hz.

12. The method of claim 11, wherein a bandwidth or acoustic frequency range of at least one optical signal receiver is configured to sense backscattered optical signals selected from a frequency range of at least one of 0-20 Hz, 0-30 Hz, 0-80 Hz, 0-100 Hz, 0-250 Hz and 0-1250 Hz.

13. The method of claim 11, wherein the backscattered optical signals include higher frequency acoustic signals derived from higher frequency acoustic disturbances in excess of 2 Hz, the method including demodulating data from the backscattered optical signals, and processing the data to identify at least some of the higher frequency acoustic signals in conjunction with the weight-induced compression wave.

14. The method of claim 13, wherein the weight-induced compression wave and the higher frequency acoustic signals are correlated to extract additional data in respect of objects which are a source of both disturbances.

15. The method of claim 14, wherein the higher frequency acoustic signals are greater than 2 Hz.

16. The method of claim 15, wherein the higher frequency acoustic signals correspond to at least one of 2-1250 Hz, 2-100 Hz, 2-80 Hz, 10-1250 Hz, 10-100 Hz, 10-80 Hz, 20-80 Hz, and 40-80 Hz.

17. The method of claim 11, wherein the backscattered optical signals are received from the plurality of optical fibers via an optical receiver arrangement comprising a plurality of optical signal receivers.

18. The method of claim 17, further comprising:
sequentially distributing optical signals in the train through the plurality of optical fibers via corresponding optical fiber ports.

19. The method of claim 18, wherein a plurality of the optical fibers are optical trunk fibers, each of which includes additional optical switching arrangements for sequentially distributing optical signals in a signal train through a plurality of optical branch fibers via corresponding optical fiber ports, wherein the optical signal receivers are configured to receive the backscattered optical signals from the optical trunk fibers via the optical branch fibers.

* * * * *